US 8,228,883 B2

(12) United States Patent
Yim et al.

(10) Patent No.: US 8,228,883 B2
(45) Date of Patent: Jul. 24, 2012

(54) METHOD AND NETWORK FOR TRANSMITTING DATA IN A WIRELESS NETWORK WITH FIXED TRANSMISSION INTERVALS

(75) Inventors: Raymond Yim, Cambridge, MA (US);
Zhifeng Tao, Arlington, MA (US);
Zafer Sahinoglu, Arlington, MA (US);
Man-On Pun, Cambridge, MA (US)

(73) Assignee: Mitsubishi Electric Research Labortories, Inc., Cambridge, MA (US)

( * ) Notice: Subject to any disclaimer, the term of this patent is extended or adjusted under 35 U.S.C. 154(b) by 233 days.

(21) Appl. No.: 12/651,517

(22) Filed: Jan. 4, 2010

(65) Prior Publication Data
US 2011/0167126 A1    Jul. 7, 2011

Related U.S. Application Data

(63) Continuation-in-part of application No. 12/651,472, filed on Jan. 3, 2010.

(51) Int. Cl.
*H04W 4/00* (2009.01)
*H04W 72/00* (2009.01)
(52) U.S. Cl. .................... 370/338; 455/452.2
(58) Field of Classification Search .................. 370/338, 370/342–348; 455/422.1, 426.2, 448–452.2; 375/260–264
See application file for complete search history.

(56) References Cited

U.S. PATENT DOCUMENTS

| 6,505,035 | B2 | 1/2003 | Ue | |
|---|---|---|---|---|
| 6,807,146 | B1* | 10/2004 | McFarland | 370/208 |
| 7,123,624 | B1* | 10/2006 | Margon | 370/445 |
| 7,330,457 | B2 | 2/2008 | Panwar | |
| 2005/0058151 | A1* | 3/2005 | Yeh | 370/445 |
| 2008/0207253 | A1* | 8/2008 | Jaakkola et al. | 455/550.1 |
| 2008/0291855 | A1* | 11/2008 | Bata et al. | 370/311 |
| 2011/0035491 | A1* | 2/2011 | Gelvin et al. | 709/224 |
| 2011/0167126 | A1* | 7/2011 | Yim et al. | 709/211 |

OTHER PUBLICATIONS

Liang et al, "Performance Analysis and Reliability Improvement of Bluetooth Broadcast Scheme"; IEEE 2006 1st International Symposium on Pervasive Computing and Applications; pp. 775-780.*

* cited by examiner

*Primary Examiner* — Thai Hoang
(74) *Attorney, Agent, or Firm* — Dirk Brinkman; Gene Vinokur

(57) ABSTRACT

A wireless network master node periodically broadcasts beacons that specify a structure of a following fixed length superframe. Slave nodes determine a channel condition between each slave and the master. Then, the set of slaves is partitioned into subsets of slaves according to the channel conditions. The master assigns, to each slave, a transmission rate in a low to high order according to the channel conditions, and the slaves transmit data to the master in the low to high order between two consecutive beacons, wherein the subsets of slaves with a higher transmission rate also receive the data from the subsets of slaves with a lower transmission rate, and wherein a slave with a higher transmission rate includes a part of or all the data from a slave with a lower transmission rate.

14 Claims, 7 Drawing Sheets

METHOD AND NETWORK FOR TRANSMITTING DATA IN A WIRELESS NETWORK WITH FIXED TRANSMISSION INTERVALS

RELATED APPLICATIONS

This U.S. Patent Application is a Continuation-in-Part of U.S. patent application Ser. No. 12/651,472, entitled, "Cooperative Relay Communication in Wireless OFDMA Star Networks," filed Jan. 3, 2010, by Yim et al. incorporated herein by reference.

FIELD OF THE INVENTION

This invention relates in general to wireless communication networks, and in particular to dynamic assignment of network resources to cooperating network nodes to improve communication reliability.

BACKGROUND OF THE INVENTION

U.S. Pat. No. 7,330,457 describes a cooperative wireless communication network where a wireless source node (source) uses a relay node to forward data to a destination node (destination) if the relaying reduces delay. Otherwise, the traffic is sent directly from the source to the destination. Transmission rates on links between the source, relay and destination depend on channel conditions. However, that method is only applicable for wireless local area networks (LAN), and the decision of whether or not to use the relay is made at the source node.

U.S. Pat. No. 6,505,035 describes rate control in a wireless network. The transmission rate between a base station and each mobile station can be changed according to the channel state information, and reception quality. The mobile station can report the reception quality to the base station, and the base station switches the transmission rate accordingly. That method does not consider the use of relay nodes.

As shown in FIG. 1A, U.S. patent application Ser. No. 12/651,472, entitled, "Cooperative Relay Communication in Wireless OFDMA Star Networks," filed Jan. 3, 2010, by Yim et al. describes a star network including N slave nodes (slaves) 101, and a master node 102 (master). The slaves can use orthogonal frequency division multiple access (OFDMA) and code division multiple access (CDMA) to concurrently transmit to and receive from the coordinator. The $N_C$ sub-carriers of the network are equally assigned so that each slave has is assigned $N_C/N$ sub-carriers. Typically the data are transmitted as packets.

As shown in FIG. 1B, a transmission interval between two beacons 105 broadcast by the master constitutes a superframe 110. The slaves are assigned to groups. For slaves in the same group, they have the same active interval 111, and inactive intervals 112. Slaves in different groups have different active and inactive intervals. The slaves transmit data concurrently to the master during their respective active interval after receiving the beacon, and the slaves are inactive during their respective inactive interval. That method assumes that all the slaves use the same modulation and coding scheme, regardless of the channel conditions between slaves and the master.

Clarification Note: Some slaves may have inactive period first, then active, then become inactive again. So for slaves in the same group, they have the same active interval (singular), and have either one or two inactive intervals.

SUMMARY OF THE INVENTION

A wireless network master node periodically broadcasts beacons that specify a structure of a following fixed length superframe. Slave nodes determine a channel condition between each slave and the master.

Then, the set of slaves is partitioned into subsets of slaves according to the channel conditions. The master assigns, to each slave, a transmission rate in a low to high order according to the channel conditions.

The slaves transmit data to the master in the low to high order between two consecutive beacons, wherein the subsets of slaves with a higher transmission rate also receive the data from the subsets of slaves with a lower transmission rate, and wherein a slave with a higher transmission rate includes a part of or all the data from a slave with a lower transmission rate.

DETAILED DESCRIPTION OF THE PREFERRED EMBODIMENT

Figure 1A:
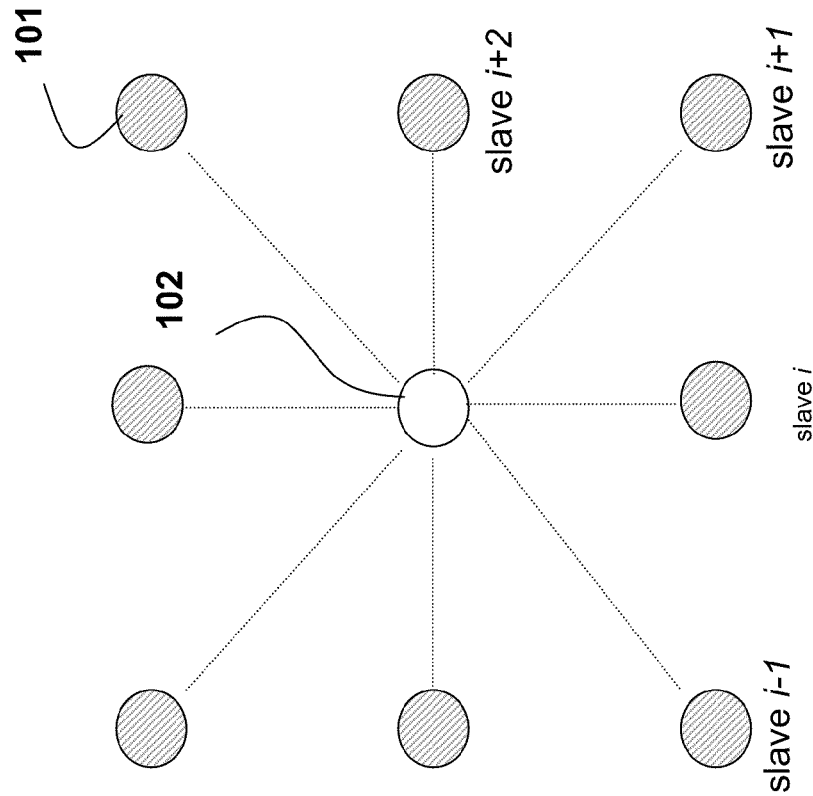
FIG. 1A is a schematic of a prior art wireless star network.
Figure 1B:
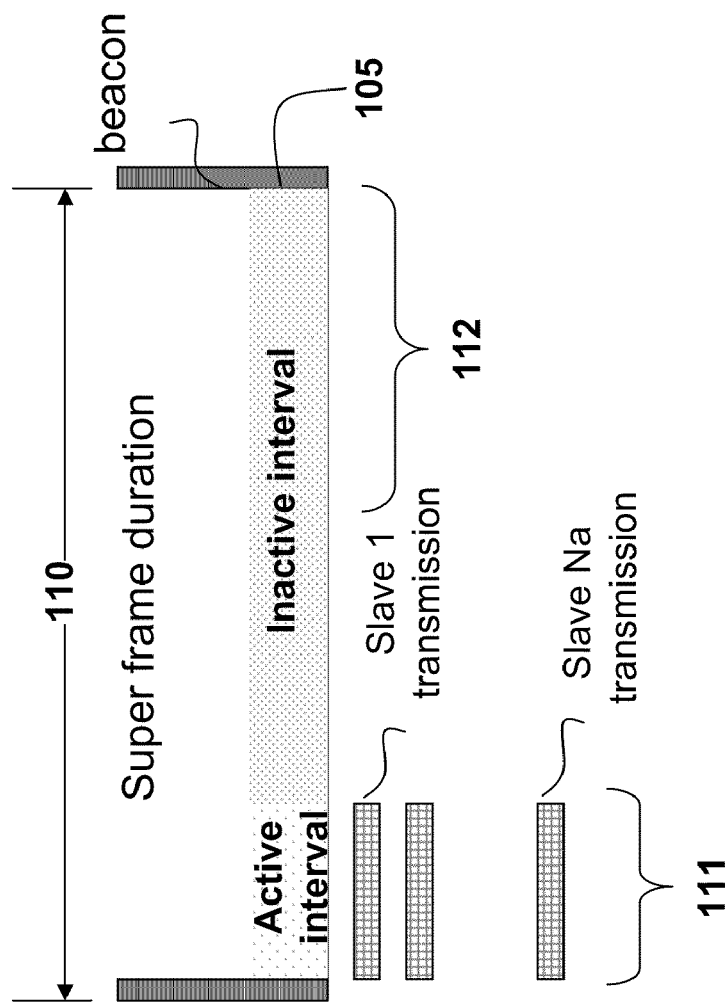
FIG. 1B is a schematic of transmission intervals in the network of FIG. 1A.
Figure 2A:
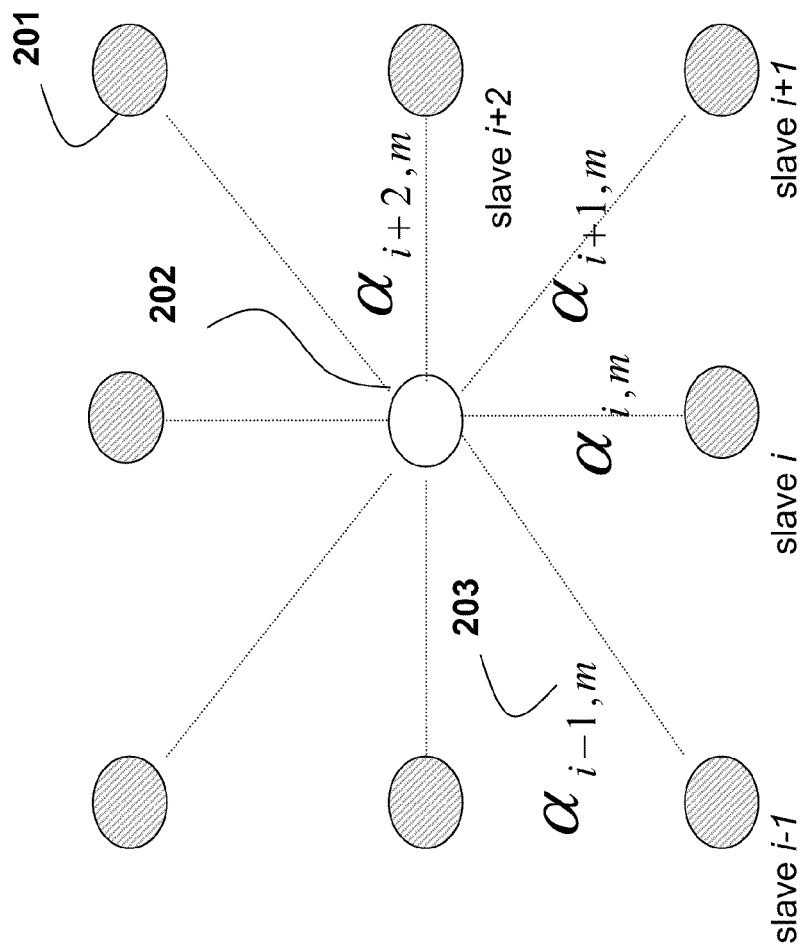
FIG. 2A is a schematic of a wireless star network according to embodiments of the invention.

FIG. 2A shows a wireless star network according to embodiments of our invention. The network can be designed according to the IEEE 802.15.4 standards.

The network includes a set of N slave nodes (slaves) 201, and a master node (master) node 202. Average channel condition between slave i and the master is $\alpha_{i,m}$ 203. The slaves can use time division multiple access (TDMA) that allows only a single slave node to transmit at a given time. Alternatively, the slaves can also use orthogonal frequency division multiple access (OFDMA), or code division multiple access (CDMA), which enables multiple, but perhaps not all, slaves to transmit their data to the master concurrently. It is understood that the data can be transmitted as packets. It is also understood that a combination of the aforementioned multiple access technology can be used, such as TDMA and OFDMA.

Figure 2B:
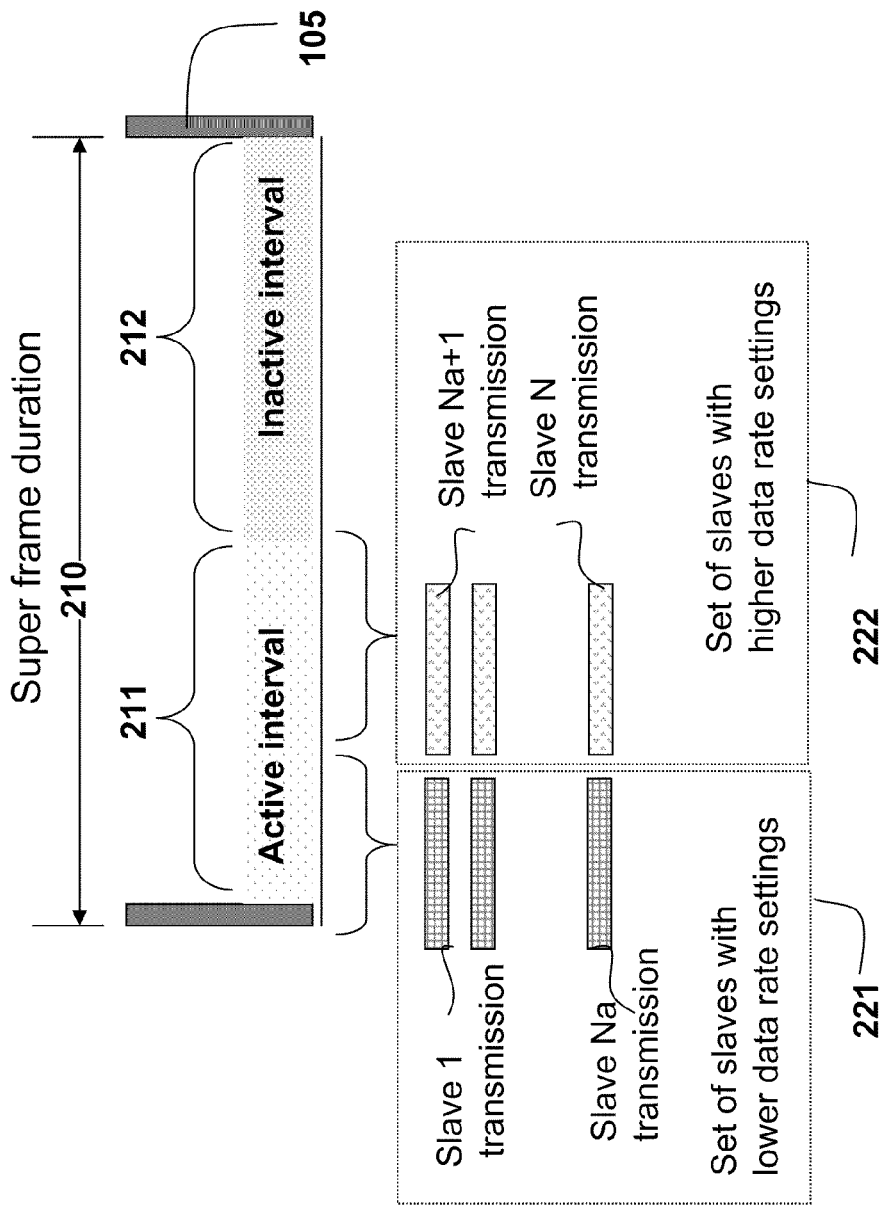
FIG. 2B is a schematic of transmission intervals in the network of FIG. 2A.
Figure 3A:
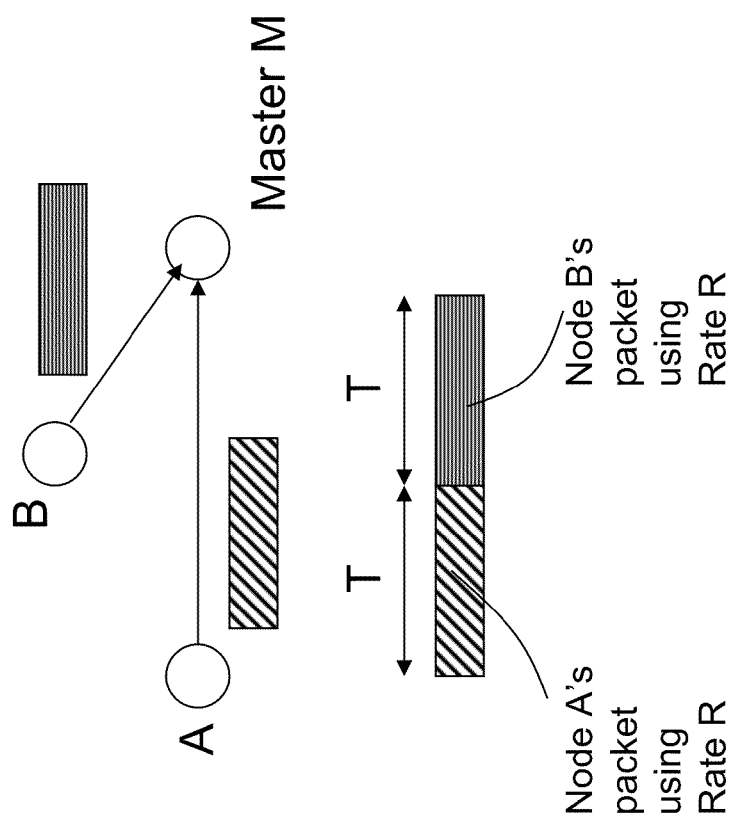
FIG. 3A is a schematic of a prior art transmission schedule.
Figure 3B:
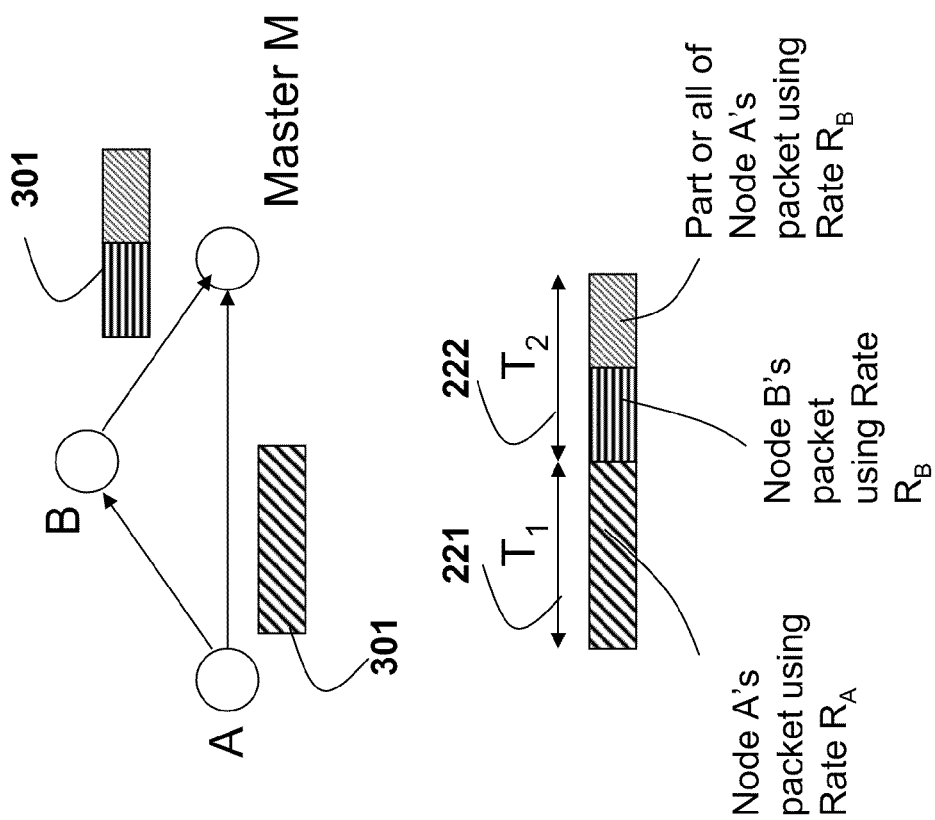
FIG. 3B is a schematic of a transmission schedule according to embodiments of the invention.

As shown in FIGS. 2B and 3B, the superframe intervals 210 is partitioned into an active interval T 211 and an inactive interval 212. The active interval is further partitioned into a first active interval $T_1$ 221 and a second active interval $T_2$ 222. It is possible to partition the active interval into more than two intervals.

Inactive interval is optionally specified by the frame structure. It may be used to support another network within proximity without collisions. The second network can operate within the inactive interval of the current network.

Our invention particularly considers an OFDM network with $N_C$ data sub-carriers. The $N_C$ sub-carriers are equally assigned to the slaves. Slaves with relatively worse channel condition to the master are grouped together virtually in a first subset and configured to transmit at lower data rates during the first active interval. The remaining slaves with better channel conditions are grouped together into a second subset and configured to transmit at higher data rates during the second active interval. It is understood that more than two subsets can be used. Also, it is understood that the nodes in the same subset does not need to transmit at the same transmission rate.

The slaves with lower data rate transmit concurrently after receiving a beacon broadcast by the master, but before the slaves with higher data rate. The slaves in a higher data rate subset monitor the transmissions of the lower data rate slaves. The slaves in the higher data rate subset then transmit, at the higher data rate, their own data, and also the data received from corresponding low data rate slaves in the first subset.

Basic Scenario

FIG. 3A shows a scenario according to U.S. patent application Ser. No. 12/651,472, entitled, "Cooperative Relay Communication in Wireless OFDMA Star Networks," filed Jan. 3, 2010, by Yim et al. where there are two slave nodes A and B, and the master node M. Nodes A and B are instructed by the master to transmit during two different intervals. Node A transmits data before node B. Both nodes transmit the same amount of information, and use an equal amount of frequency resource to transmit their data. The frame structure also assigns the same amount of time T for each transmission.

The two nodes also use the same modulation and coding scheme to transmit their data. In the example, both nodes transmit data at rate R. Node B has a better channel condition to the master on average than node A, possibly due to the fact that different slave node has different distance from the master. Hence, in this transmission scheme, the error probability for node A is higher than that for node B.

As shown in FIG. 3B, node A first transmits packet 301 at data rate $R_A$ within $T_1$ seconds. Given the transmission parameters, (e.g., modulation, coding scheme, transmission power), and the channel condition between A and the master node, it is possible to calculate an error probability $P_{EA}$ for transmission of packet 301.

During the transmission from node A to the master node, node B also receives the packet 301. When node B transmits, because Node B has a better channel to the master than node A does, the master instructs node B a-priori to use a different set of transmission parameters, and hence a higher rate $R_B$, to transmit its data. For example, if node A uses QPSK as a modulation scheme to transmit, node B may be instructed to use 16-QAM. Alternatively, nodes A and B may use the same modulation scheme, but node A uses rate ⅓ convolutional code, while node B uses rate ½ convolutional code. Finally, node B may use a different power to transmit its data.

The transmission parameters are selected by the master so that the packet error probability of transmission from node B is no more than $P_{EA}$. Because the node B's data 302 has the same amount of information as node A's data, a higher transmission rate means that node B's data takes less than $T_1$ seconds to transmit.

In U.S. patent application Ser. No. 12/651,472, entitled, "Cooperative Relay Communication in Wireless OFDMA Star Networks," filed Jan. 3, 2010, by Yim et al., if node B finishes the transmission in less than $T_1$ seconds, the remaining resource is wasted due to the fixed frame structure, or due to other transmission in OFDMA networks.

In this invention, node B uses the whole time $T_2$ to transmit data, which includes not only the data that originates from node B, but also any part of the data 302 originated from source node A, which was received by node B.

In other words, data from node A is piggybacked onto the packet transmitted by node B. Note that node B does not have to transmit the data from node A. It is possible that node B uses a hash functions to coarsely summarize information contained in data A, e.g., a bit-wise exclusive OR of different portions of data A. The master can use this information to improve the decoding performance for data received from node A.

The times $T_1$ and $T_2$ are assigned according to a frame structure and duration that can be specified by the master node using the beacon signal. The instruction of transmission parameters used by every slave node for packet transmission, and also the parameters used for piggybacking are also specified by the master node.

It is important to note that this invention differs from that described in U.S. Pat. No. 7,330,457. There, the transmission parameters for packet A are changed so that data are sent to node B only when favorable channel conditions are observed. The decision of whether or not to use node B is made by node A.

In contrast, node A in this invention transmits its data to the master node, and node B also receives the data. Then, node B changes its transmission parameters so as to support a higher data rate, and in a way that has at least the same or better packet error performance than node A, and node B transmit its data while piggybacking data from node A. Here, the decisions are made by the master.

Variations

FIG. 3B shows a TDMA scenario, where node A transmits first, and node B transmits second. In addition, the method also applies to OFDMA networks where multiple nodes transmit data concurrently. For example, in the scenario described in FIG. 3B, it is possible that node C transmits at the same time as node A using different frequency resource, and a node D transmits at the same time as node B using different frequency resource. Also, this scenario generalizes to case where more than two transmission opportunities exist during a given superframe. For example, node E may transmits after node B, and the transmission from node E contains packet E while piggybacking information from any or both of data A and B.

Reporting Whether a Slave Overhears Another Packet

Instead of piggybacking partial or complete data from previous transmissions, a node can include a flag bit to denote whether the node has received a copy of transmission from the nodes that have previously transmitted. This flag bit can be used by the master to schedule retransmission, and request a node with better channel condition to relay the data, instead of letting the slave that sourced the data retransmit. In this case, the master can send a group acknowledgement (GACK) to all the slaves that have relaying data as needed.

Determining Schedules Through Groupings

Figure 4:
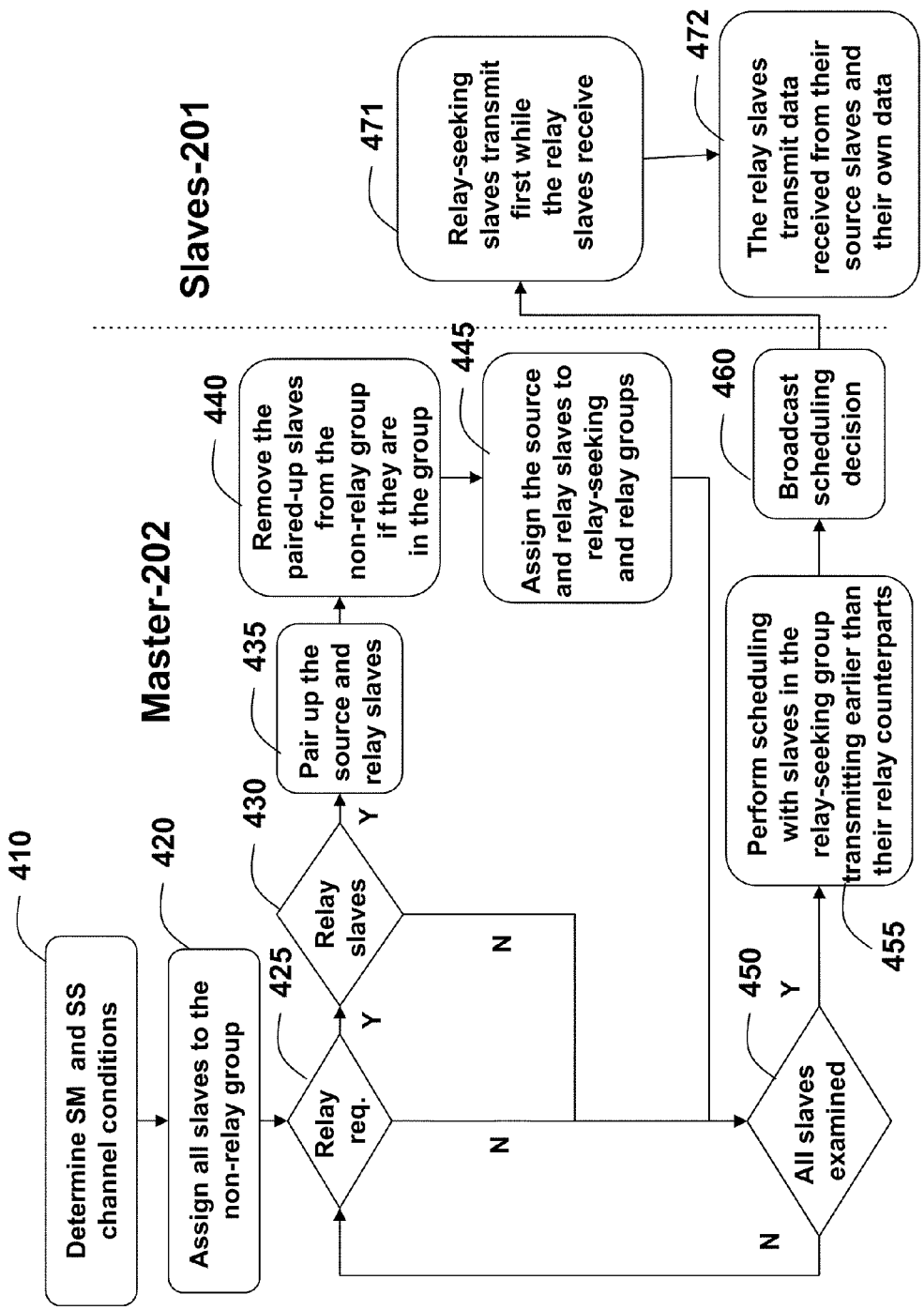
FIG. 4 is a flow diagram of the transmission schedule according to embodiments of the invention.

FIG. 4 shows the steps for grouping slaves according to embodiments of the invention. The steps of the method include steps performed at the master, and steps performed at each slave.

The network first operates in a training mode. During the training mode, the master determines 410 channel conditions between the master and each slave, and optionally between any two slaves. One example to achieve this task is that the slaves estimate the required channel conditions and feed back the estimate to the master.

At the end of the training mode, the master has the channel conditions for the entire network. The channel conditions remain approximately constant throughout a predetermined amount of time since the network operation environment and locations of slaves and master remain stationary.

The master assigns 420 all slaves to the non-relay group. For each slave in the group, the master evaluates 425 the necessity of seeking relay for the slave. If it is determined that relay is required, the master tries to find 430 a relaying slave for the slave.

If a relaying slave is found, then the master pairs 435 up the slave with the relaying slave. Each source slave can be paired up with multiple relay slaves. After removing 440 both nodes from the non-relay group, the master assigns the slave and its corresponding relaying slave to the relay-seeking and relay groups, respectively, and repeats until all slaves have been examined 450.

If relaying is not required or a relaying slave cannot be found, then the method proceeds to examine the next slave in the non-relay group until all slaves in the non-relay group are examined 450.

After all slaves have been examined, the master performs scheduling 455 in such a way that relay-seeking slaves transmit first 471, while relaying slaves transmit later 472. The broadcast beacon 460 contains the scheduling decisions including data rate assignment of each slave and identifications of their corresponding slave partners from other subsets.

The subset assignment information for each slave is implicitly contained in the beacon broadcast 460 by the master. One of the following two types of data rates is assigned to each slave.

The data rate $R_{i,m}$ when transmitting from slave i to the master, or the data rate $R_{i,j}$ when transmitting from slave i to slave j.

Slave i transmits its packet to slave j at $R_{i,j}$, only if the following conditions are satisfied:

$R_{i,j} > R_{i,m}$, slave j belongs to the high data rate slave group; and $R_{j,m} > R_{i,m}$.

Upon receiving the scheduling decisions, the relay-seeking slaves first transmit while the master and relay slaves receive. After that, the relay slaves transmit data received from the corresponding source slaves, together with their own data. According to the invention, the slaves can be partitioned into more than two subsets, as long as all relay-seeking slaves transmit earlier than their relay counterparts.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating data in a wireless network, including a master node (master) and a set of slave nodes (slaves), comprising:
    broadcasting periodically beacons by the master, wherein the beacons specify a structure of a following fixed length superframe;
    determining a channel condition between each slave and the master;
    partitioning the set of slaves into a plurality of subsets of slaves according to the channel conditions;
    assigning, by the master, to each slave, a transmission rate in a low to high order according to the channel conditions; and
    transmitting, during the superframe, the data from each subset of slaves to the master in the low to high order between two consecutive beacons, wherein the subsets of slaves with a higher transmission rate also receive the data from the subsets of slaves with a lower transmission rate, and wherein a slave with a higher transmission rate includes a part of or all the data from a slave with a lower transmission rate.

2. The method of claim 1, further comprising:
    determining slave-to-slave (SS) channel conditions between two slaves;
    determining SS transmission rates according to the SS channel conditions;
    transmitting data by a slave A to slave B at the SS transmission rate between the slave A and the slave B if the SS transmission rate between the slave A and the slave B is higher than the slave-to-master (SM) transmission rate of the slave A, and if the slave B transmits data after the slave A, and if the SM transmission rate of the slave B is higher than the SM transmission rate of the slave A.

3. The method of claim 1, wherein the network uses Orthogonal Frequency Division Multiple Access (OFDMA).

4. The method of claim 3, wherein the slaves are partitioned into multiple disjoint subsets, and wherein slaves in one subset group operate in receive mode while slaves in another subset transmit.

5. The method of claim 1, wherein the network uses Time Division Multiple Access (TDMA).

6. The method of claim 1, wherein the network uses a frame structure defined in a IEEE 802.15.4 standard.

7. The method of claim 1, the slaves and the master are stationary for a predetermined time.

8. The method of claim 7, wherein the master determines an average channel conditions over a period of time, and wherein the master assigns the schedule that specifies an order in which the slaves transmits the data.

9. The method of claim 1, wherein the data from each a slave includes an indication whether the slave received data from other slaves prior to transmission.

10. The method of claim 1, wherein the master indicates whether the data from each slaves is received successfully through a Group Acknowledgement (GACK) signal.

11. The method of claim 1, wherein the slaves transmit during a fixed length frame structure.

12. The method of claim 11, wherein a duration of the transmitting is less than or equal to a duration of the frame structure.

13. The method of claim 1, wherein the packet error probability of the transmission from the subsets of slaves with a higher transmission rate has is no more than that of the transmission from the subsets of slaves with a lower transmission rate.

14. The method of claim 1, wherein some slaves within a particular group transmit at different data rates.

* * * * *